United States Patent
Young et al.

(10) Patent No.: US 8,100,004 B2
(45) Date of Patent: Jan. 24, 2012

(54) WEATHER PREDICTION SYSTEM

(75) Inventors: Philip John Young, Northampton (GB); Angelo Genghi, Como (IT)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 12/599,242

(22) PCT Filed: May 22, 2008

(86) PCT No.: PCT/EP2008/056338
§ 371 (c)(1),
(2), (4) Date: Nov. 6, 2009

(87) PCT Pub. No.: WO2008/148649
PCT Pub. Date: Dec. 11, 2008

(65) Prior Publication Data
US 2010/0212421 A1    Aug. 26, 2010

(30) Foreign Application Priority Data
Jun. 7, 2007    (EP) .................................... 07109832

(51) Int. Cl.
*G01W 1/00*    (2006.01)
(52) U.S. Cl. ........................................ 73/170.16; 73/384
(58) Field of Classification Search .................. None
See application file for complete search history.

(56) References Cited

U.S. PATENT DOCUMENTS

| | | | |
|---|---|---|---|
| 6,522,298 B1 | 2/2003 | Burgett et al. | |
| 6,798,378 B1 * | 9/2004 | Walters | 342/357.57 |
| 6,970,795 B1 * | 11/2005 | Burgett et al. | 702/85 |
| 2004/0196176 A1 * | 10/2004 | Burgett et al. | 342/120 |
| 2007/0016346 A1 * | 1/2007 | Alanen et al. | 701/4 |
| 2007/0040732 A1 * | 2/2007 | Burgett et al. | 342/120 |
| 2009/0143983 A1 * | 6/2009 | Venkatraman et al. | 701/214 |

FOREIGN PATENT DOCUMENTS

JP    09096679    4/1997

OTHER PUBLICATIONS

International Search Report and Written Opinion—PCT/EP2008/056338, International Search Authority—European Patent Office, Aug. 6, 2008.

* cited by examiner

*Primary Examiner* — Andre Allen
(74) *Attorney, Agent, or Firm* — Shyam K. Parekh; Howard H. Seo

(57) ABSTRACT

The invention consists of a barometric pressure sensor, coupled to a processor for recording changes in the pressure over time, this is coupled to a GPS device providing an accurate measurement of the altitude which allows for the barometric pressure measurements to be normalized, typically to mean sea level. Once the measurements have been normalized the effects of the vertical motion of the sensor are effectively removed and the resulting trend shows the absolute atmospheric pressure which can then be used for weather prediction.

11 Claims, 1 Drawing Sheet

Fig. 1
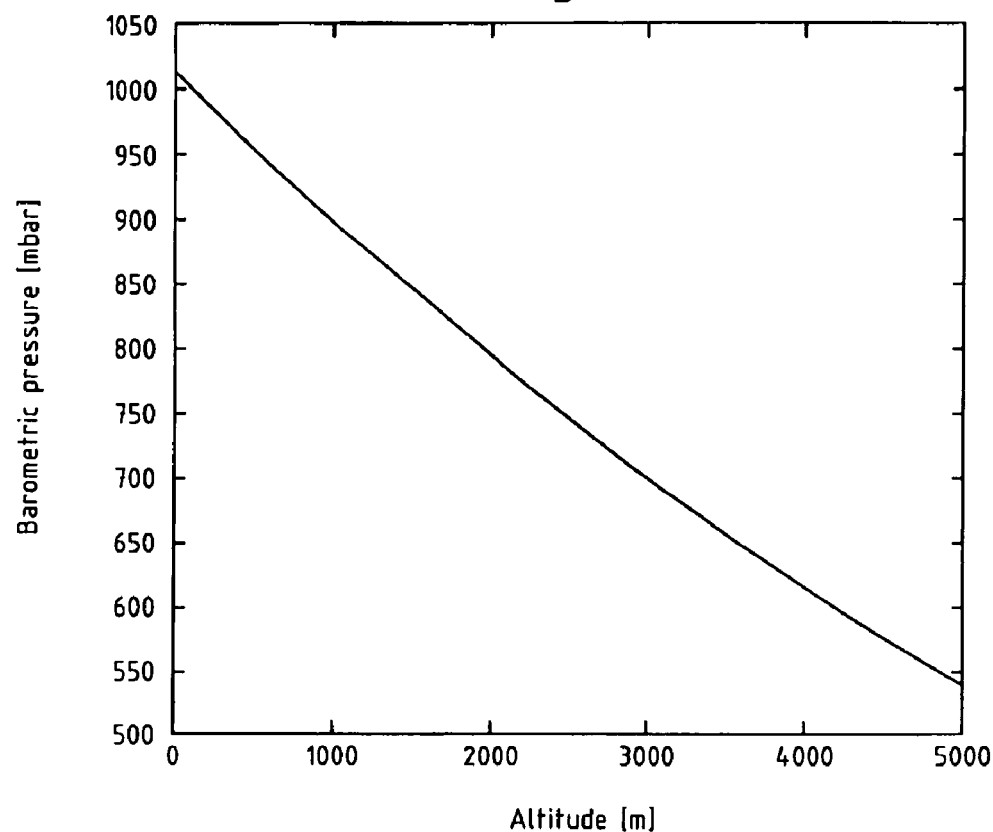
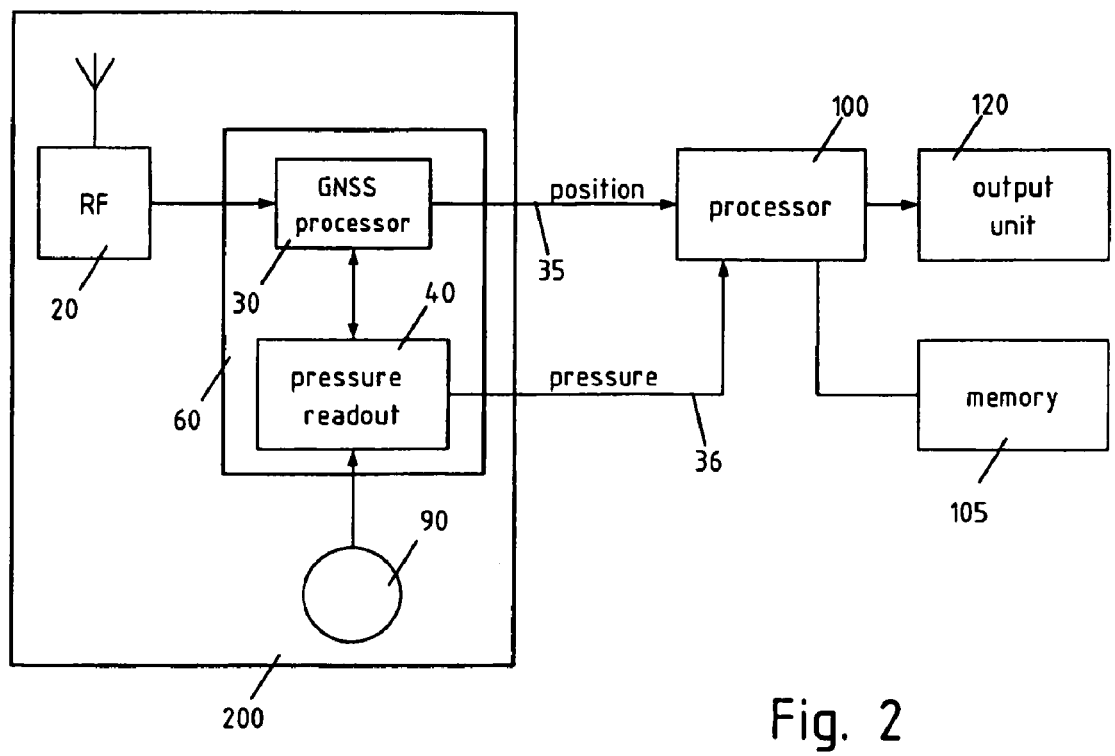
Fig. 2

WEATHER PREDICTION SYSTEM

FIELD OF THE INVENTION

Embodiments of the present invention are related with weather prediction systems and in particular with weather prediction systems relying on measuring local changes in local meteorological atmospheric data. The present invention is further concerned with a signal processor unit adapted for realizing such a weather prediction system.

DESCRIPTION OF RELATED ART

Existing weather prediction systems rely on measuring changes in atmospheric pressure, temperature, and humidity over time. By monitoring changes in air pressure over an extended period the trend in pressure can be used to make predictions regarding the short term weather patterns, with falling pressure indicating an unstable air flow and increased chance of poor weather.

In home use barometers have been available for centuries, and more recently electronic weather stations have come onto the market which automate the prediction. It is known to generate automatically meteorological prediction on the base of meteorological atmospheric data like temperature, barometric pressure, and humidity.

Predicting weather relies on the trends in barometric pressure often over many hours, this requires the sensor to remain relatively stationary with respect to altitude since the barometric pressure is a function of the air density and altitude. One drawback of these known technologies is their requirement to be in a stable location for extended periods of time in order to track the barometric pressure trends.

Some manufacturers have released portable units, and for several years barometric pressure sensors have been available in watches, altimeters and other portable instruments, with instructions for using them to predict likely weather patterns. Such instruments, however, are affected by pressure variations due to a change in altitude, and can not provide an automatic prediction with reliability, unless they are stationary.

Such units lack altitude compensation and require that the sensor be stable with respect to the horizontal plane. This prevents the use of such mobile sensors for weather prediction during normal use. Typically watches for instance may be used to give a prediction in the morning assuming that they have been stationary overnight, but can not be used to predict weather when traveling. Additionally the existing technology can only operate on the pressure trends, whereas weather prediction also relies on a knowledge of the absolute pressure normalized to sea level.

There is therefore a need for a portable weather prediction system that can generate reliable predictions while in motion. The present invention aims to provide such a system.

A further aim of the present invention is to provide a portable system that combines the weather prediction with location information in a precise and economical way.

BRIEF SUMMARY OF THE INVENTION

According to the invention, these aims are achieved by means of a mobile weather monitoring and prediction system by using absolute altitude measurements made by a satellite radiolocalization system to compensate for the effects of altitude, thus providing a calibrated measurement of absolute atmospheric pressure in a mobile environment.

BRIEF DESCRIPTION OF THE DRAWINGS

The invention will be better understood with the aid of the description of an embodiment given by way of example and illustrated by the figures, in which:

FIG. 1 shows a diagram of the barometric pressure dependence from altitude, according to the international atmosphere model.

FIG. 2 illustrates, in a simplified schematic way, a possible realization of the device of the invention.

DETAILED DESCRIPTION OF POSSIBLE EMBODIMENTS OF THE INVENTION

According to FIG. 2, a portable device according to one aspect of the invention comprises a satellite radiolocalization receiver, including an antenna and a RF front-end 20 arranged to receive radiolocalization signal from a constellation of positioning satellites, for example GPS, GLONASS or Galileo satellites, and condition them in a form suitable for the GNSS processor 30, for example a carrier-stripped signal or a low-IF signal in digital or analogue format. GNSS processor 30 deals with the radiolocalization signals and extracts, as it is known in the art, position data 35 comprising both horizontal coordinates, for example latitude and longitude, and altitude data as well.

According to one aspect of the invention, a pressure readout unit 40 is arranged to read input from a barometric sensor 90, for example am electronic sensor of absolute pressure open to the local atmospheric pressure, and provide pressure data 36, for example as digital pressure values in a standard unit, like kPa or mbar. Preferably GNSS processor 30 and pressure readout unit 40 are realized in a single electronic component 60, for example a single integrated circuit, including an input for a barometric pressure sensor 90.

A processor 100 records the changes in the pressure 36 over time and is further coupled to the GNSS processor 30 providing position data 35 containing altitude information, which allows for the barometric pressure measurements to be normalized to a standard altitude, typically to mean sea level. FIG. 1 represents a standard barometric curve that can be used to this purpose. Other barometric curves are however available.

Processor 100 may be a general-purpose microprocessor, executing a program stored in a memory 105, containing a software module to normalize pressure to a standard altitude, identify meteorological pressure trends, and provide a weather forecast, to be displayed on the output unit 120.

Altitude data obtained from satellite positioning system often includes artifacts, for example glitches, due to erratic satellite visibility, or multipath. While the amplitude of these artifacts may be significant, their duration is, as a rule, much shorter than the time span of typical meteorological phenomena, which are relevant for the weather forecast. Processor 100 is then programmed filter out the unwanted artifacts, before using them to normalize the barometric data 36, for example by buffering and averaging altitude data over a suitable time interval. Pressure data 36 should preferably be buffered and average cove a comparable time interval.

Typical air pressure at mean sea level is 1013.25 mbar (101.325 KPa), and pressure above this is generally associated with calm weather, whereas pressure significantly below this is associated with higher wind speeds and unsettled weather. Existing mobile stations are unable to measure the absolute pressure unless the altitude is manually entered but usually this is not known by a traveler. Consequently mobile stations indicate the absolute pressure at their location from which it is impossible to know whether the current atmospheric conditions are part of a 'Low pressure' or 'High Pressure' system.

The typical atmospheric pressure at sea level ranges between 990 and 1030 mbar which is equivalent to an altitude variation of approximately +/−200 metres, consequently altitude uncertainty gives a significant error in the measurements which current solutions do not compensate for.

In addition, rapid changes in pressure and temperature often occur as a storm approaches, these short tern rapid changes of typically a few mbar are equivalent to altitude changes of a few tens of meters and can be used to warn about the imminent arrival of a severe storm, or other meteorological dangers, for example tornados. This is only possible if the effects of altitude variation are compensated since these rapid changes are still small with respect to the effects of altitude.

According to a variant of the present invention, processor 100 could be a processor of a host system, for example a PDA, a mobile phone, or a portable computer, having access to a GPS and weather unit 200. Access may be realized by a physical and electrical connection, or by some suitable wireless data network, for example by a Bluetooth link. Memory 105 may as well contain other software modules to display a user's GPS position, assist navigation and so on.

According to another variant, pressure readout unit 40 could take over some of the computation, thus relieving the processor 100. For example altitude averaging and pressure normalization could be carried out in the pressure readout unit, which could provide pressure data 36 already normalized to a standard altitude.

Once the measurements have been normalized the effects of the vertical motion of the sensor are effectively removed and the resulting trend shows the absolute atmospheric pressure which can then be used for weather prediction.

The average measurements are buffered in memory and stored periodically, where the periods may be fixed or variable, and may also be timestamped to allow correction for missed measurements.

Periodically the data store is processed to determine the absolute and rate of change of normalized barometric pressure; these are then used to predict the likely weather, and any changes, in particular with relation to the onset of imminent storms which may represent a threat. This processing may be automatically scheduled as part of a regular forecasting algorithm, as samples are added/discarded as part of the data management process, or on demand, for example when the user requests an immediate forecast.

Alternatively the average data may be stored prior to compensation for altitude and compensated as it is processed, but this is less optimal since it needs to be processed each time the table is analyzed.

Additionally, the GPS co-ordinates may be stored with each sample set, this allows for filtering an apparent change in absolute pressure caused by the users horizontal motion in relation to the weather system, where horizontal motion over a few hundred Km may cause apparent pressure changes even in a stable weather system due to the horizontal pressure gradient in the weather system.

In addition to the weather forecast mode, the device of the invention has preferably also a positioning mode, in which it offers the usual functions of a GPS unit, for example position and navigation information, speed, distance and bearing of waypoints, estimated time of arrival, a track graph, and so on.

The invention claimed is:

1. A portable weather forecast device, comprising
a barometric pressure sensor; and
a satellite radiolocalization unit,
the device configured to obtain pressure data normalized to a standard altitude based on position data generated by the satellite radiolocalization unit, and barometric pressure data generated by the barometric pressure sensor.

2. The portable device of claim 1, wherein the satellite radiolocalization unit configured to generate positioning data, based on radiolocalization signals received from radiolocalization satellites, said positioning data containing an altitude information, and wherein the portable device is programmed to compute said pressure data reduced to a standard altitude based on a time-average of said altitude information.

3. The portable device of claim 2, further comprising
an output unit configured to reproduce on the output unit a weather forecast based on the time variations of the pressure data reduced to a standard altitude.

4. The portable device of claim 3, further, programmed to raise a warning signal upon detection of potentially dangerous meteorological situations.

5. The portable device of claim 3 further comprising
a localization/navigation mode configured to position and/or information navigation on the output unit.

6. A method for providing a weather forecast with a portable device, comprising:
generating position data by a satellite radiolocalization unit; and
obtaining pressure data normalized to a standard altitude based on said position data generated by the satellite rediolocalization unit, and barometric pressure data generated by a barometric pressure sensor.

7. The method of claim 6, wherein generating positioning data is based on radiolocalization signals received from radiolocalization satellites, and positioning data containing an altitude information, and wherein the portable device is programmed to compute said pressure data reduced to a standard altitude based on a time-average of said altitude information.

8. The method of claim 7, further comprising
reproducing on an output unit a weather forecast based on the time variations of the pressure data reduced to a standard altitude.

9. The method of claim 8, further comprising
raising a warning signal upon detection of potentially dangerous meteorological situations.

10. The method of claim 8, further comprising
providing position and/or information navigation on the output unit in a localization/navigation mode.

11. A portable weather forecast device, comprising
means for generating position data by a satellite radiolocalization unit; and
means for obtaining pressure data normalized to a standard altitude based on said position data generated by the satellite rediolocalization unit, and barometric pressure data generated by a barometric pressure sensor.

* * * * *